(No Model.)
C. J. VAN DEPOELE.
SYSTEM OF GENERATING AND DISTRIBUTING ELECTRIC CURRENTS.
No. 287,347. Patented Oct. 23, 1883.
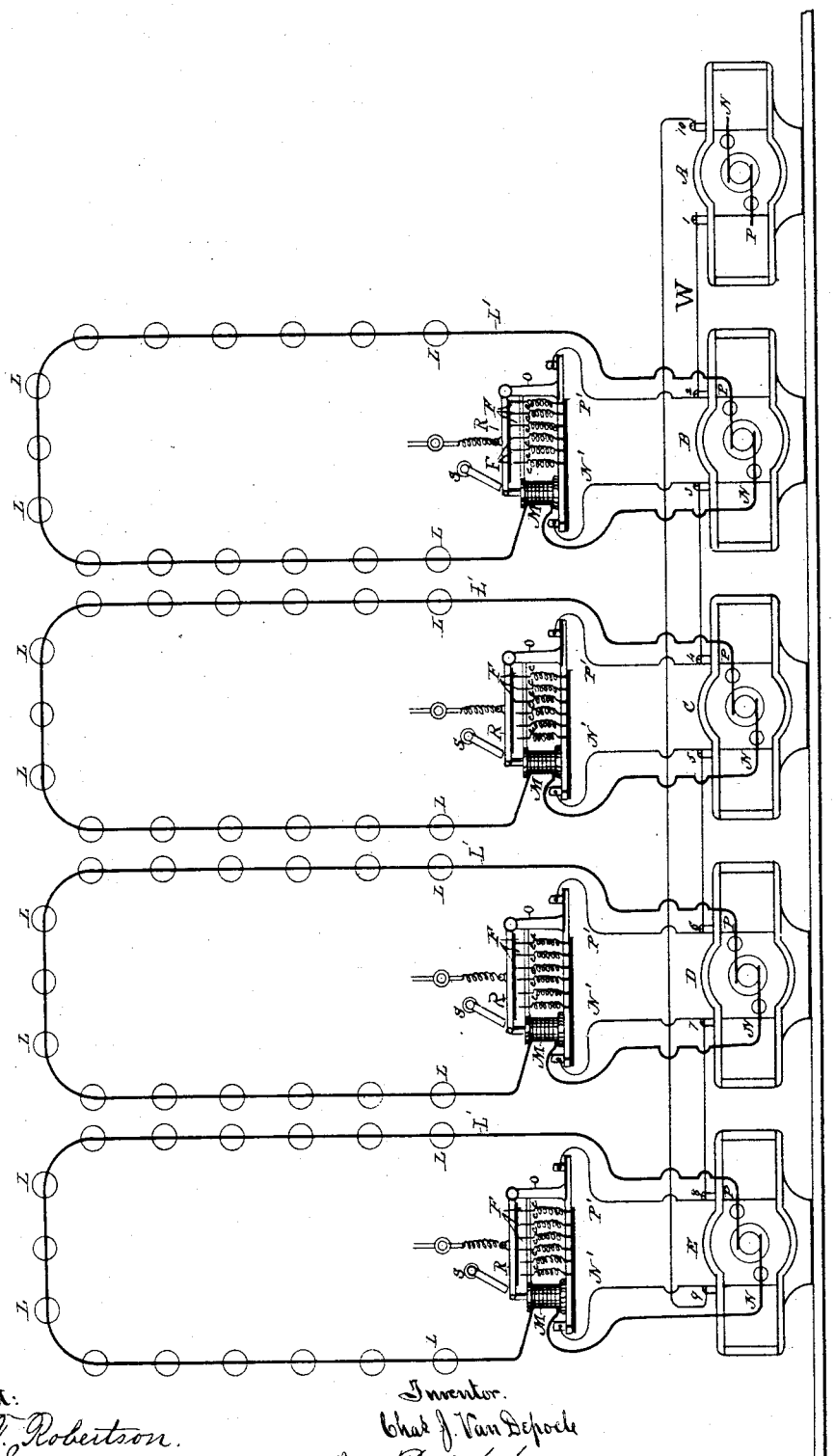
Attest:
W. T. Robertson.
C. Scully.
Inventor.
Chas. J. Van Depoele
By Thos. S. Sprague
Atty.
N. PETERS. Photo-Lithographer, Washington, D. C.

UNITED STATES PATENT OFFICE.

CHARLES J. VAN DEPOELE, OF CHICAGO, ILLINOIS.

SYSTEM OF GENERATING AND DISTRIBUTING ELECTRIC CURRENTS.

SPECIFICATION forming part of Letters Patent No. 287,347, dated October 23, 1883.

Application filed April 3, 1883. (No model.)

*To all whom it may concern:*

Be it known that I, CHARLES J. VAN DEPOELE, of Chicago, in the county of Cook and State of Illinois, have invented new and useful Improvements in a System of Generating and Distributing Electrical Currents; and I do hereby declare that the following is a full, clear, and exact description thereof, reference being had to the accompanying drawing, which forms a part of this specification.

My invention relates to new and useful improvements made in the use of electric currents as applied to electric lighting or other purposes to which the current may lend itself.

The special features of my invention consist in the regulation of the currents produced at a central station, enabling the consumers to cut out their lights or motors, or to cut the same into circuit, and at the same time cause the generators to produce the necessary amount of current, and no more, in order to save the cost of motive power, &c. In fact, the system is intended to distribute from a central point a large number of currents, and to produce the same economically, as I will now describe and explain. Reference should be had to the annexed drawing, forming a part of this specification.

In the drawing is shown a system intended for a central station to furnish, say, two hundred arc-lights.

A is a dynamo used as an exciter in communication with the dynamos B, C, D, and E, and is intended to magnetize the fields of B, C, D, and E with as much strength as each may need. The current produced in A is common to B, C, D, and E, which have all their field-magnets connected in series with A, while the armatures are in no way in circuit with their respective fields, nor with the current produced in A. The armatures are provided with the usual collectors or brushes, from which the current is taken, to be used outside of the machines, and led where needed by proper conductors. The generator A has its field-magnets wound and connected in derivation, so that the current may regulate itself to the resistance outside of the machine, which in this case consists of the coils of the field-magnets of the generators B, C, D, and E. A is so wound and connected that the current will rise with the augmentation of resistance in the field-circuit of B, C, D, and E, while the reverse will take place when the resistance in said field-circuit is diminished by cutting out the whole or part of the field or fields of any of the machines.

The field-circuit can be traced out by starting at 1 in A to 2 in B, out at 3, and so on through the whole number of machines in field-circuit, the circuit being completed at 10 in A. As will be seen, the lamp-circuit starts at P in each of the dynamos from one of the commutator-brushes, and is conducted to lamps L or other devices. In returning to station the lamp-circuit or external circuit is made to pass through a solenoid, M, entering at one end and leaving at the other, to complete the circuit at the brush N. This is the same for each machine. The action of the solenoid will be explained hereinafter, and is intended to regulate the current in the field-helices. It will be seen that in each machine B, C, D, and E the field binding-posts—as in B, for instance, 2 and 3—are connected to a current-regulator or shunting device by means of wire N' and P'.

This current-regulator is intended to regulate the strength of the magnetic fields, and operates as follows: The current controller or regulator is the same as patented to me January 9, 1883, and consists of a number of channels or resistances, c, so proportioned that whenever the current is allowed to pass through all the resistances in multiple arc at the same time the conducting capacity of all said resistances will be equal to that of the line-wire W, thus offering, practically, no resistance to the passage of the entire current through the regulators when their bars R are drawn down upon all the contacts by the solenoids M, at which time the current will be shunted through the regulators, instead of passing through the field-magnets, the resistance of the latter being about ten ohms, more or less, according to the size of the wire used, or the amount of the same; but if, instead of pressing down or bringing the bar R in contact with all the channels, said bar only presses upon a certain number of the contacts F F F F, so much of the current will be diverted from the field-magnet coils as the channels will allow to pass, correspondingly decreasing the intensity of the magnetic fields, at the same time also diminishing the resistance in the circuit, which will in turn react upon the current produced in A, as above stated. The exciting-machine A accommodates itself to the outside resistance it is working upon, so that in case all the bars R were pressed in contact with their respective contacts F F F F in all the machines, no appreciable current would pass through the field-magnets of the machines B, C, D, and E. The resistance of the exciter-circuit being thus reduced to almost nothing, no current would be generated in A, on account of the resistance of its external circuit being reduced to almost nothing by being shunted through the regulators, instead of overcoming the greater resistance of the field-magnets of B, C, D, and E. Consequently there would be no current generated in any of the machines; but let us raise the bar R from some of the contacts F F F F, the resistance in the exciter-circuit will be increased. A will produce so much current as the resistance to be overcome will require. Part of the current will pass through the field-coils and part through the channels c. Said field-coils will excite the magnets with a strength corresponding to the amount of current passing through said field-coils, so that the armature under the influence of its field-magnet will be able to return a current also corresponding to the energy with which the field-magnets act upon the armature. By allowing the whole current to pass through the field-coils, the armature will come up to its maximum work. By allowing more or less current to be shunted from the fields through the channels F F F F, consequently more or less current can be produced in the armature under the influence of the field of force in which it revolves. Now, in order to work the bar R upon contacts F F F F of current-regulator, we can use a solenoid M the coils of which are included in the external circuit, so that whenever a lamp or other device is cut out of circuit said solenoid will draw its core in deeper, thus bringing down the bar R upon a larger or smaller number of channels F F F F, as the case may be, thus shunting more or less current from the field-coils through the shunting device, and in so doing the dynamo will be made to produce only so much current as may be needed in the outside circuit. In case that one of the machines should not be running or the current not needed, by simply turning the stop S down upon the bar of current-regulator the current will be diverted from the fields, and A will only take power in proportion to the current needed for the remaining working machines. By this system we are enabled to energize the fields of any number of machines from one generator or exciter, while at the same time each machine can be perfectly regulated without in the least interfering with the other dynamos in operation. As the number of lights or other devices are cut out of circuit, the solenoid M of that particular circuit will draw down more or less the bar of the current-regulator and allow more or less current to be diverted from the field-magnets of said machine, thus regulating its capacity. The current diverted from the field-coils passes through the channels of the current-regulator, and in so doing the resistance in the outside circuit of A will be decreased proportionately, and less current will pass through the field-coils of A, hence diminishing its electro-motive force, and consequently the power required to drive the same will be lessened in direct proportion. When in several of the external circuits a larger or smaller number of lamps are cut out of circuit, each circuit will take care of itself, regulating the current in its own machine. Since A responds instantaneously to any variation in its own circuit in which are all the field-helices and the shunting devices or regulators, the more current there is passing through the shunting devices, the more is the resistance in the outside circuit of A decreased. By decreasing the external resistance of said circuit, we provide an easier path for the current generated in the armature of A, which said machine being a shunt-dynamo its current divides between its own field-magnets and its external circuit, (which includes the field-magnets of all the generators,) so that by reducing the resistance in the outside circuit of A we diminish the current in its field-magnet coils, and so regulate the current produced in the same. By increasing the resistance in the external circuit of A we give a chance to its field-magnet coils to get more current, and thus increase the power in its field-magnets, and so in the armature, when the current will balance again between its field-coils and the other field circuit.

The whole system of generators can be driven from one source of power, and so arranged as to stop or start any of the generators at will, as may be required; but at all times the exciter should be driven, whether for one or all the other generators.

What I claim as new is—

1. A system of distribution for electrical currents, consisting of a generator or exciter arranged to magnetize the field-magnets of a number of other generators the armatures of which will give independent currents not common with the currents in the exciting-machine, the field-coils of the exciting-machine being in a derived circuit closed upon its armature, as described and set forth.

2. In a system of distribution for electrical currents, a generator or exciter, A, used to energize the field-coils of a number of machines which produce each their own independent current, and proper means for regulating the current in each machine independent from the others, as described, and for the purpose specified.

3. In a system for the distribution of electrical currents, a number of electrical generators driven by some source of power, one of said generators being used as an exciter to energize the fields of the other machines, the current of said exciter being independent from the current produced in the armature of the other generators, and proper means to regulate the current in the field-magnets of the excited machine, each field-circuit having its independent current-regulator or shunting device, whereby each machine can be made to produce a current proportionate to the amount of work in the external circuit of such machine or generator, as above described, and for the purpose specified.

4. In a system of distribution of electrical currents, a generator or exciter, in combination with a number of generators having all their field-coils connected in series in the circuit of said exciter, and proper means for short-circuiting any or all of said field-helices, substantially as described.

5. In a system for the distribution of electric currents, a number of generators, each having a current-regulator in its armature or external circuit, which regulator is operated by a solenoid, also included in said circuit, the field-coils of said generators being energized by the current from a special machine, and means whereby each regulator is adapted to allow current to flow through the field-magnets of the generator with which it is connected proportionate to the resistance in its external circuit, substantially as set forth.

6. In a system of electrical distribution of currents, the exciter A, in combination with the generators B, C, D, and E, having their field-magnet coils in circuit with A, and shunting devices R, interposed between the terminals of said field-coils, the shunting devices being operated by the solenoids M, which are in circuit with the external or working circuit of said generators, substantially as described, and for the purpose set forth.

7. A system for generating and distributing electrical currents, consisting of a number of electrical generators, all driven at the same time, one of said generators being arranged to supply the necessary current to the field-magnet coils of the other generators as they may require, the amount of current in such field-coils being controlled by a current-regulator or shunting device interposed between the poles of each of the field-magnet coils, said shunting devices only being put in circuit when the current in the exterior circuit attains more than its normal strength, as described, and for the purpose set forth.

CHARLES J. VAN DEPOELE.

Witnesses:
    THEO. P. BAILEY,
    FRANK STEWART.